US012750355B2

(12) United States Patent
Findik et al.

(10) Patent No.: US 12,750,355 B2
(45) Date of Patent: Sep. 29, 2026

(54) SINGLE SIGN-ON AT THE OPERATING SYSTEM LEVEL

(71) Applicant: IGEL Technology GmbH, Bremen (DE)

(72) Inventors: Muhammed-Ali Findik, Karlsruhe (DE); Juergen Schneider, Meitingen (DE); Emad Hosseini, Augsburg (DE); Markus Ongyerth, Meitingen (DE)

(73) Assignee: IGEL TEACHER GMBH, Bremen (DE)

( * ) Notice: Subject to any disclaimer, the term of this patent is extended or adjusted under 35 U.S.C. 154(b) by 148 days.

(21) Appl. No.: 18/639,894

(22) Filed: Apr. 18, 2024

(65) Prior Publication Data

US 2025/0330456 A1 Oct. 23, 2025

(51) Int. Cl.
*H04L 9/40* (2022.01)

(52) U.S. Cl.
CPC ........ *H04L 63/0815* (2013.01); *H04L 63/083* (2013.01)

(58) Field of Classification Search
CPC . H04L 63/0815; H04L 63/083; H04L 9/3226; H04W 12/069
See application file for complete search history.

(56) References Cited

U.S. PATENT DOCUMENTS 10,855,674 B1 * 12/2020 Geusz .................... H04L 63/20
2018/0152440 A1 * 5/2018 Hande ................ H04L 63/0815
2019/0058706 A1 * 2/2019 Feijoo .................. G06F 21/335
2019/0253407 A1 * 8/2019 Livanos ................ H04W 12/04
2020/0099676 A1 * 3/2020 Desarda .............. H04L 63/0815
2020/0213297 A1 * 7/2020 Suraparaju .......... H04L 63/0892
2022/0300633 A1 * 9/2022 LeVasseur .......... G06F 21/6218
2023/0259575 A1 * 8/2023 Hamedi ................ G06F 16/958 709/219

OTHER PUBLICATIONS

Swapnoneel Roy et al., On Application of Blockchain to Enhance Single Sign-On (SSO) Systems, 2021, pp. 1191-1195 (Year: 2021).*
Nam Shaikh et al. "Secured Authentication by Single Sign On (SSO): A Big Picture," 2022, pp. 951-955 (Year: 2022).*

* cited by examiner

*Primary Examiner* — Luu T Pham
*Assistant Examiner* — Canh Le
(74) *Attorney, Agent, or Firm* — NICHOLSON DE VOS WEBSTER & ELLIOTT LLP

(57) ABSTRACT

As part of a login procedure of an operating system of an end user device, a single sign-on (SSO) login service that is part of the operating system is launched. A login page of an identity provider is displayed through the SSO login service. The SSO login service interacts with the identity provider to provide the authentication credentials submitted through the login page to the identity provider and receive secrets from the identity provider including an access token, an identity token, and a session cookie. The user is logged into the operating system of the end user device using the identity token. The SSO login service makes the secrets available to one or more applications configured for the SSO login service thereby allowing the user to access the one or more applications without separately providing authentication credentials to the one or more applications.

21 Claims, 4 Drawing Sheets

SINGLE SIGN-ON AT THE OPERATING SYSTEM LEVEL

FIELD

Embodiments of the invention relate to the field of operating systems; and more specifically, to a single sign-on at an operating system level.

BACKGROUND

A single sign-on (SSO) system allows users to access multiple applications or services with the same credentials without having to log in separately for each. Such a system can simply the user experience, enhance security, and reduce the administrative overhead of managing multiple accounts and passwords.

Conventionally, an SSO system typically involves a centralized authentication provider (also known as an identity provider (IdP)) that handles user authentication. When a user attempts to access an application or service that is integrated with the SSO system, they are redirected to the authentication provider's login page to provide their credentials (e.g., username and password). The authentication provider verifies the credentials and generates an access token. The access token is sent back to the user's browser. The user can then use the access token to access other applications or services that are part of the SSO system, without having to log in again. The access token usually has an expiration time, after which the user must re-authenticate themselves.

Conventional operating system logins are authenticated against a local user directory or other proprietary authentication method. However, this leads to the necessity to login at the application level for other applications.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

An end user device includes a single sign-on (SSO) login service that is part of the operating system. As part of the login procedure of the operating system, the SSO login service displays a login page of an identity provider to the user. The user authenticates with the identity provider through the login page. The SSO login service of the operating system receives secret(s) from the identity provider for the user (e.g., an access token, an identity token, and/or a session cookie). The SSO login service logs the user into the operating system of the end user device, and makes available the secret(s) to applications on the end user device. Thus, the user can login to an identity provider and access applications without further authenticating to those applications.

Figure 1:
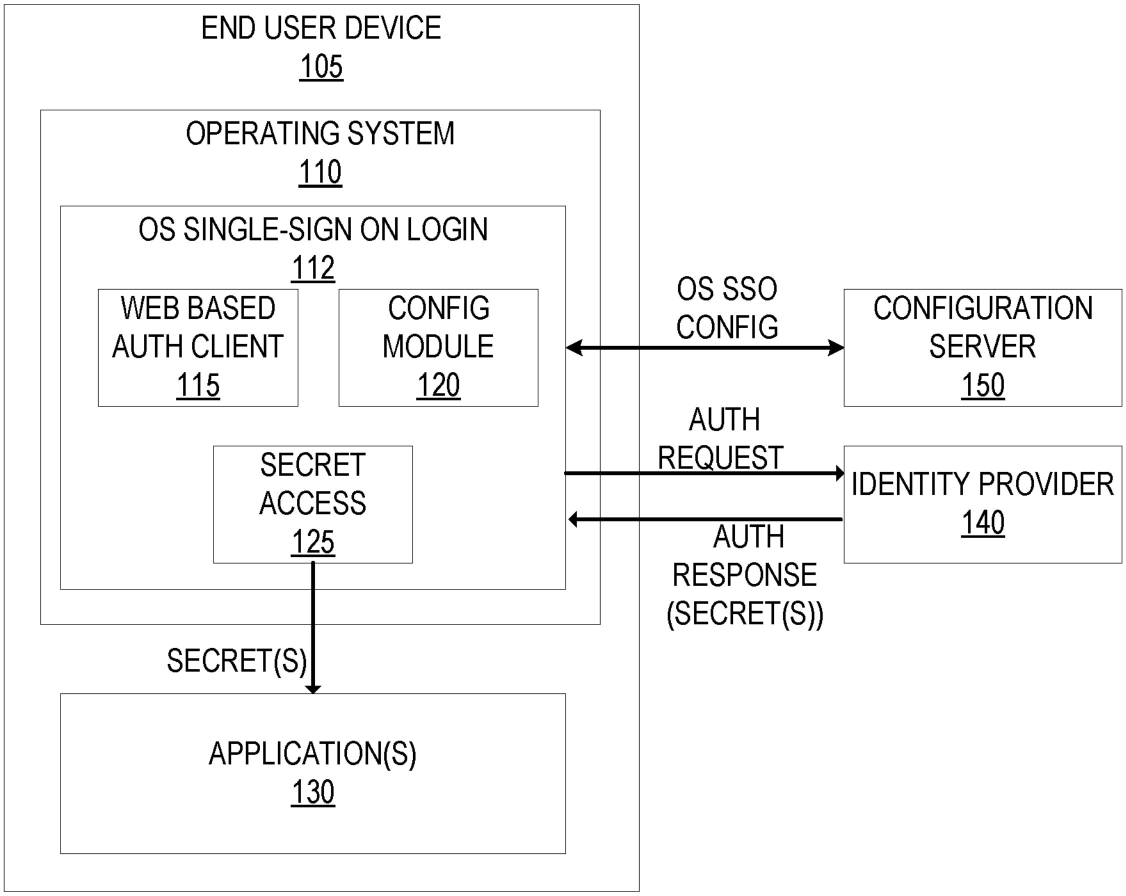
FIG. 1 illustrates an example of a single sign-on (SSO) system at an operating system level according to an embodiment.

FIG. 1 illustrates an example of a single sign-on (SSO) system at an operating system level according to an embodiment. An end user device 105 includes an operating system 110. The end user device 105 is a computing device that can execute applications such as network applications. Examples of such an end user device 105 include a laptop, a desktop, a workstation, a smartphone, a tablet, a terminal (e.g., point-of-sale system, a kiosk system), a USB stick device (sometimes known as a USB flash drive or thumb drive), and a wearable device. The end user device 105 may be a thin client device that has minimal hardware and software components and connects to a virtual desktop infrastructure (VDI) or other cloud-based desktop.

The end user device 105 runs the operating system 110. The operating system 110 can be any type of operating system such as a UNIX-based operating system, a Linux operating system, a mobile operating system, a Windows operating system, a macOS operating system, and an embedded operating system. The end user device 105 executes a set of one or more applications 130. The set of applications 130 may include applications executed within a browser executing on top of the operating system 110 and/or native applications executing on top of the operating system 110. An example of a browser based application is accessing email through the browser. An example of a native application is a virtual desktop client. To provide examples of the types of applications, they can include: a virtual desktop client, a cloud desktop, web applications (e.g., web browsers, word processing editors, spreadsheet applications, chat applications, team collaboration applications, email applications, social network applications, customer relationship manager applications, financial applications), device login, or other published applications. The set of applications 130 may connect to external resources such as external resource servers (not shown in FIG. 1). The end user device 105 may be one of many devices that are part of the same organization and configured by an administrator of the organization.

The operating system 110 executes the operating system (OS) single sign-on (SSO) login 112. The OS SSO login 112 is an SSO system that operates at the operating system level and uses web based authentication methods. The OS SSO login 112 allows usage of further applications (e.g., the applications 130) without authenticating to the applications. The OS SSO login 112 directs the user of the end user device 105 to a login page of a configured identity provider 140. The user provides their authentication credentials (e.g., username, username/password, biometrics, one-time code, certificate, etc.) to the configured identity provider 140 through the login page. The OS SSO login 112 interacts with the identity provider 140 to provide the authentication credentials received from the user and receive secret(s) from the identity provider 140. The secrets can include an access token, an identity token, and/or a session cookie from the identity provider 140. The OS SSO login 112 makes these secret(s) available to the applications 130. The user can then use the applications 130 without further logging into those applications 130.

An administrator of the end user device 105 may configure the OS SSO parameters including which identity provider to use. The administrator may register the OS SSO login 112 application with the identity provider 140. Each different identity provider may have different requirements for registration. The administrator may configure the OS SSO login 112 application at the identity provider 140 with a redirect URI as a localhost callback (e.g., http://localhost/callback). This causes the response from the identity provider 140 to be sent back to the OS SSO login 112 that sent the authentication request. The identity provider 140 creates a client secret (sometimes known as an application secret), a client identifier (sometimes known as an application identifier), and an issuer identifier (e.g., an issuer URL or a tenant identifier used in an issuer URL). Using some of these parameters, the administrator uses the configuration server 150 to configure the OS SSO login 112. For example, the administrator uses the configuration server 150 to define the identity provider to be used, enter the client secret provided by the identity provider, enter the client identifier, and enter the issuer identifier.

The configuration module 120 of the OS SSO login 112 receives the configuration from the configuration server 150 and applies the configuration for the OS SSO login 112. The configuration module 120 may request this configuration information from the configuration server 150 (e.g., a boot or login time) and/or the configuration server 150 may periodically push the configuration to the configuration module 120 (e.g., upon a change in the configuration or at a predefined schedule). The configuration received from the configuration server 150 may include the identifier of the identity provider, the client identifier, the client secret, and the issuer identifier. The end user device 105 may be one of many devices that are configured by the administrator. For instance, the end user devices may be part of the same organization and configured by an administrator of the organization.

The web based authentication client 115 of the OS SSO login 112 is a component that interacts with an identity provider 140. The web based authentication client 115 may be a web browser (e.g., a WebKit based browser, a Chromium based browser, a Gecko based browser). The web browser may be a lightweight web browser. The web based authentication client 115 may be restricted to an allowlist of URLs corresponding to allowed identity provider login pages. Based on which identity provider is configured (and optionally selected by the user), the web based authentication client 115 causes the login page of the identity provider to be displayed. The user can submit their authentication credentials using the login page presented by the web based authentication client 115. The web based authentication client 115 interacts with the identity provider 140 to receive secrets (e.g., an access token, an identity token, and/or a session cookie) if the delegated authentication was successful.

The web based authentication client 115 may be executed in a process that is terminated immediately after the login procedure is complete. The web based authentication client 115 does not store the secrets (e.g., the access token, the identity token, session cookie), or a hashed version of the secrets, after the login procedure is complete. The secrets may be stored by the external application or within a secure secret store of the operating system 110.

The secret access 125 of the OS SSO login 112 makes the secret(s) (the access token, the identity token, and session cookie) available to the set of applications 130. This allows the user to access these applications 130 without separately providing authentication credentials. The secret(s) may be injected to the applications and/or retrieved by the applications through an interface provided by the secret access 125. For example, the secret access 125 may make the session cookie(s) available to browser-based applications by injecting them into a cookie store for those applications. As another example, secret access 125 may make the access token and/or identity token available to native applications (non-browser based applications) through an interface for those applications to retrieve the tokens.

Figure 2:
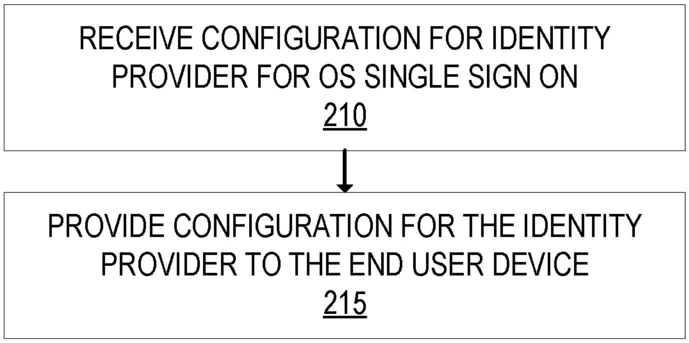
FIG. 2 is a flow diagram that illustrates exemplary operations for configuring a single sign-on service at the operating system level, according to an embodiment.

FIG. 2 is a flow diagram that illustrates exemplary operations for configuring a single sign-on service at the operating system level, according to an embodiment. The operations of FIG. 2 and the other flow diagrams are described with respect to the exemplary embodiment of FIG. 1. However, the operations of FIG. 2 and the other flow diagrams can be performed by different embodiments from that of FIG. 1; and the embodiment of FIG. 1 can perform operations different from that of FIG. 2 and the other flow diagrams.

At operation 210, the configuration server 150 receives configuration for an identity provider 140 for the OS SSO login service. The configuration server 150 provides an interface that allows an administrator to configure the OS SSO login service. For instance, the interface allows the administrator to provide the parameters for accessing the login page of the identity provider 140 and interacting with the identity provider 140. These parameters can include a client secret (sometimes known as an application secret), a client identifier (sometimes known as an application identifier), and an issuer identifier (e.g., an issuer URL or a tenant identifier used in an issuer URL). To obtain the client identifier and the client secret, the administrator must first register the OS SSO login service with the identity provider 140. The administrator may also configure the OS SSO login service with a redirect URI as a localhost callback (e.g., http://localhost/callback) at the identity provider 140.

Next, at operation 215, the configuration server 150 provides the configuration for the identity provider to the end user device 105. The configuration server 150 may provide this configuration in response to a request from the configuration module 120 of the end user device 105 (e.g., as part of the booting of the operating system 110) and/or may push the configuration to the configuration module 120. The configuration module 120 applies the configuration for the OS SSO login service.

In an embodiment, the administrator configures a single identity provider for the OS SSO login service for the end user device 105. In such an embodiment, the login page that is presented to the user is that of the single identity provider that is configured. In another embodiment, the administrator may configure multiple identity providers for the OS SSO login service for the end user device 105. In such an embodiment, the user is presented with the configured identity providers and the user may select which identity provider to use; and the login page that is presented to the user is of the selected identity provider.

Figure 3:
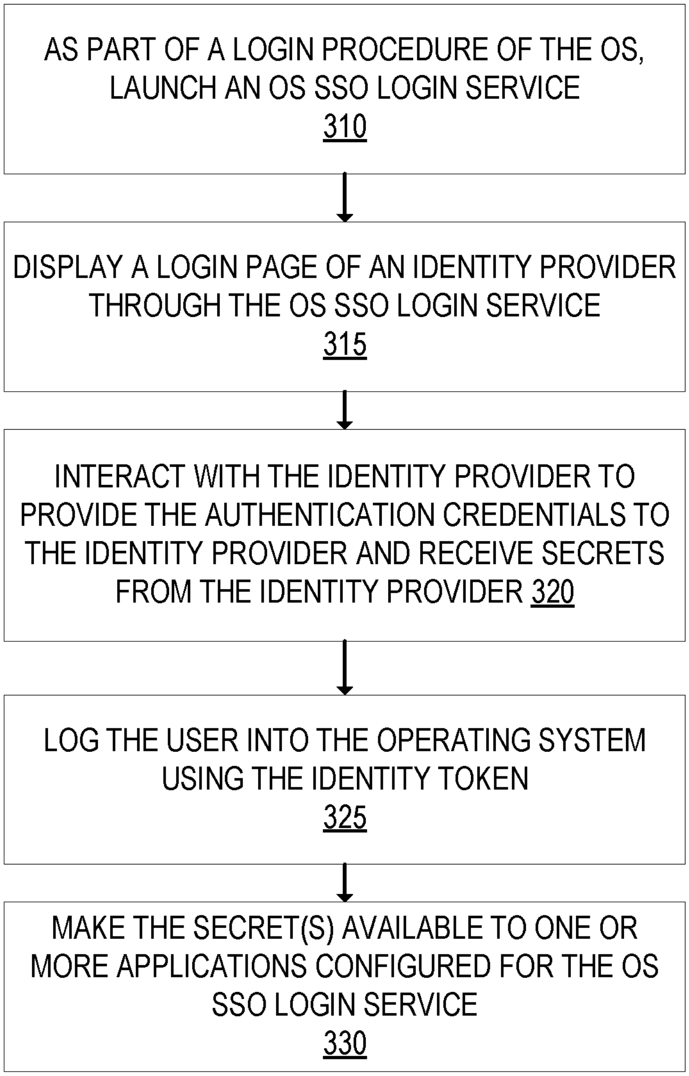
FIG. 3 is a flowchart that illustrates exemplary operations performed in an end user device for a single sign-on at the operating system level, according to an embodiment.

FIG. 3 is a flowchart that illustrates exemplary operations performed in an end user device for a single sign-on at the operating system level, according to an embodiment.

At operation 310, as part of a login procedure of the operating system 110 of the end user device 105, the operating system 110 launches an OS SSO login service (e.g., the OS SSO login 112) that is part of the operating system 110 of the end user device 105.

Next, at operation 315, the OS SSO login service displays a login page of an identity provider 140 using the web based authentication client 115. The login page allows a user of the end user device 105 to submit authentication credentials for the identity provider 140. The web based authentication client 115 may be a lightweight browser for displaying the login page. Such a lightweight browser may not include the ability for tabs, bookmarks, URL bar, reload button, extensions, menu bar, status bar, search bar, etc. In such a way, the login page feels to the user like they are interacting with a standard login page and not interacting with a conventional browser. If the administrator has configured multiple identity providers for the OS SSO login service for the end user device 105, prior to operation 315, the OS SSO login service displays a selection choice that allows the user to select a configured identity provider, and the login page that is displayed in operation 315 is that of the selected identity provider.

The login page may be displayed as a result of the web based authentication client 115 transmitting an authentication request to the identity provider 140 using at least some of the configured information. For example, the authentication request may be directed to a URL of the identity provider (e.g., the issuer URL which may include the tenant identifier), for example to an/authorize endpoint, and include the client identifier and the redirect URI (e.g., a localhost callback such as http://localhost/callback). The identity provider 140 validates such a request and if valid, sends the login page that is rendered at the web based authentication client 115.

Next, at operation 320, the SSO login service interacts with the identity provider 140 to provide the authentication credentials received from the user and receive one or more secrets (e.g., an access token, an identity token, and a session cookie) from the identity provider. The authentication credentials received through the login page may be a username, username/password, biometrics, one-time code, certificate, etc. The identity provider 140 performs the authentication of the user. If successful, the identity provider 140 transmits an authentication response to the SSO login service that includes an authorization code. The SSO login service can exchange the authorization code for an access token and the identity token. For example, the SSO login service transmits a request for an access token and an identity token. This request is sometimes referred herein as a token request. This request includes the client identifier, the client secret, and the authorization code. The SSO login service receives a response (sometimes referred herein as a token response) that includes the access token and the identity token. The SSO login service validates this response such as validating the identity token including validating the signature of the identity token. The identity token proves that the user has been authenticated with the identity provider 140. The identity token includes claims asserted about the authenticated user that can include a name, nickname, email, picture, phone number, address, birth date, time zone information, and/or other profile data, etc. The claims are defined by the identity provider 140. The access token can be used for accessing protected resources at a resource server. The access token can be a bearer token, which can be presented in the header of API requests. The session cookie(s) associated with the domain of the identity provider 140 may also be captured by the SSO login service after the successful authentication. These session cookie(s) can be used by the application without requiring further authentication.

Next, at operation 325, the SSO login service logs the user into the operating system 110. The identity token can be used by the SSO login service to personalize the operating system 110 according to the identified user. For example, the claims asserted about the authenticated user in the identity can be used to personalize the operating system 110 and/or applications 130 executing on the end user device 105. As an example, the name in the identity token may be used to show the name of the user logged into the operating system 110. As another example, the time zone information of the identity token may be used to setup the time zone of the end user device 105. As another example, the name or email address may be used to lookup customization or preferences set by the user for the operating system 110.

Next, at operation 330, the SSO login service makes the secret(s) (e.g., the access token, the identity token, and/or the session cookie) available to one or more applications 130 configured for the SSO login service. This allows the user to access these applications 130 without separately providing authentication credentials. The secret(s) may be injected to the applications and/or retrieved by the applications through an interface provided by the secret access 125. For example, the secret access 125 may make the session cookie(s) available to browser-based applications by injecting them into a cookie store for those applications. As another example, secret access 125 may make the access token and/or identity token available to native applications (non-browser based applications) through an interface for those applications to retrieve the tokens. When a particular application 130 attempts to access a protected resource, that application can fetch the access token for the resource using the identity token. If the identity token is not valid (e.g., it has expired), the application can direct the user to the login page of the identity provider configured for the application for renewal of the token. If the session cookie is available, the identity provider can provide new tokens and no further login is needed.

Figure 4:
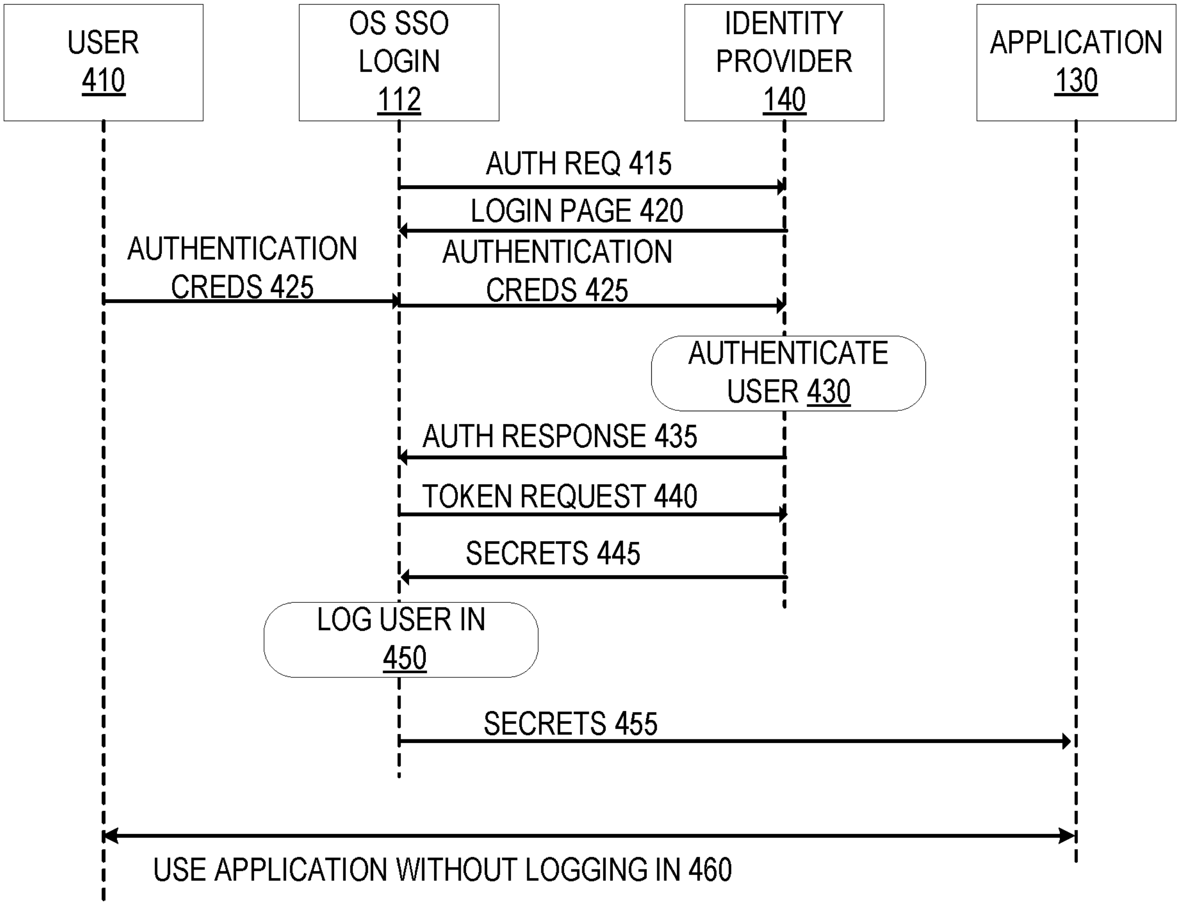
FIG. 4 is a sequence diagram that illustrates exemplary operations for the use of single sign-on service at the operating system level according to an embodiment.

FIG. 4 is a sequence diagram that illustrates exemplary operations for the use of single sign-on service at the operating system level according to an embodiment. The operations of FIG. 4 may begin as a result of a login process of the operating system 110, which can occur after booting of the end user device 105 or otherwise logging into the operating system 110.

At operation 415, the OS SSO login 112 transmits an authentication request to the identity provider 140. This authentication request is directed to a URL of the identity provider (e.g., the issuer URL which may include the tenant identifier depending on which identity provider is configured), includes the client identifier and a redirect URI as the local callback. This authentication request may be directed to an/authorize endpoint of the identity provider 140. The identity provider 140 validates such a request, and if valid, transmits the login page to the OS SSO login 112 at operation 420. This authentication request is transmitted by the web based authentication client 115 of the OS SSO login 112; and the web based authentication client 115 receives and renders the login page.

The login page allows the user to provide authentication credentials (e.g., username, username/password, biometrics, one-time code, certificate, etc.) to the identity provider 140. Thus, at operation 425, the user 410 provides authentication credentials through the login page rendered by the OS SSO login 112. The authentication credentials are transmitted from the OS SSO login 112 to the identity provider 140 at operation 425. The identity provider 140 authenticates the user at operation 430. Different identity providers may have different requirements for authenticating the user. As an example, the user may have to satisfy any multifactor requirements of the identity provider 140.

Assuming that the user is authenticated, the identity provider 140 transmits an authentication response to the OS SSO login 112 at operation 435. The authentication response includes an authorization code that can be exchanged for secrets (e.g., an access token and an identity token). The OS SSO login 112 transmits a token request to the identity provider 140 at operation 440. The token request includes the client identifier, the client secret, and the authorization code. The token request may be directed to a /token endpoint of the identity provider 140. The identity provider 140 validates the token request, and if valid, transmits an access token and an identity token to the OS SSO login 112 at operation 445 (e.g., in a token response). The OS SSO login 112 validates this response such as validating the identity token including validating the signature of the identity token. The identity token proves that the user has been authenticated with the identity provider 140. The identity token includes claims asserted about the authenticated user such as name, nickname, email, other profile data, etc. The access token is used for accessing protected resources at a resource server. The access token can be a bearer token, which can be presented in the header of API requests. The session cookie(s) associated with the domain of the identity provider 140 may also be captured by the SSO login service after the successful authentication. These session cookie(s) can be used by the application without requiring further authentication.

After receiving the tokens, the OS SSO login 112 logs the user into the operating system 110 at operation 450. The OS SSO login 112 uses the identity token to personalize the operating system 110 according to the identified user. For example, the claims asserted about the authenticated user in the identity can be used to personalize the operating system 110 and/or applications 130 executing on the end user device 105. As an example, the name in the identity token may be used to show the name of the user logged into the operating system 110. As another example, the time zone information of the identity token may be used to setup the time zone of the end user device 105. As another example, the name or email address may be used to lookup customization or preferences set by the user for the operating system 110.

The OS SSO login 112 makes the secret(s) (e.g., the access token, the identity token, and/or the session cookie) available to the set of applications 130. This allows the user 410 to access these applications 130 without separately providing authentication credentials. The secret(s) may be injected to the applications and/or retrieved by the applications through an interface provided by the secret access 125. For example, the secret access 125 may make the session cookie(s) available to browser-based applications by injecting them into a cookie store for those applications. As another example, secret access 125 may make the access token and/or identity token available to native applications (non-browser based applications) through an interface for those applications to retrieve the tokens. As shown in FIG. 4, the secret9s) are provided to an application 130 at operation 455. Afterwards, the user 410 can use the application 130 without logging in, at operation 460.

Figure 5:
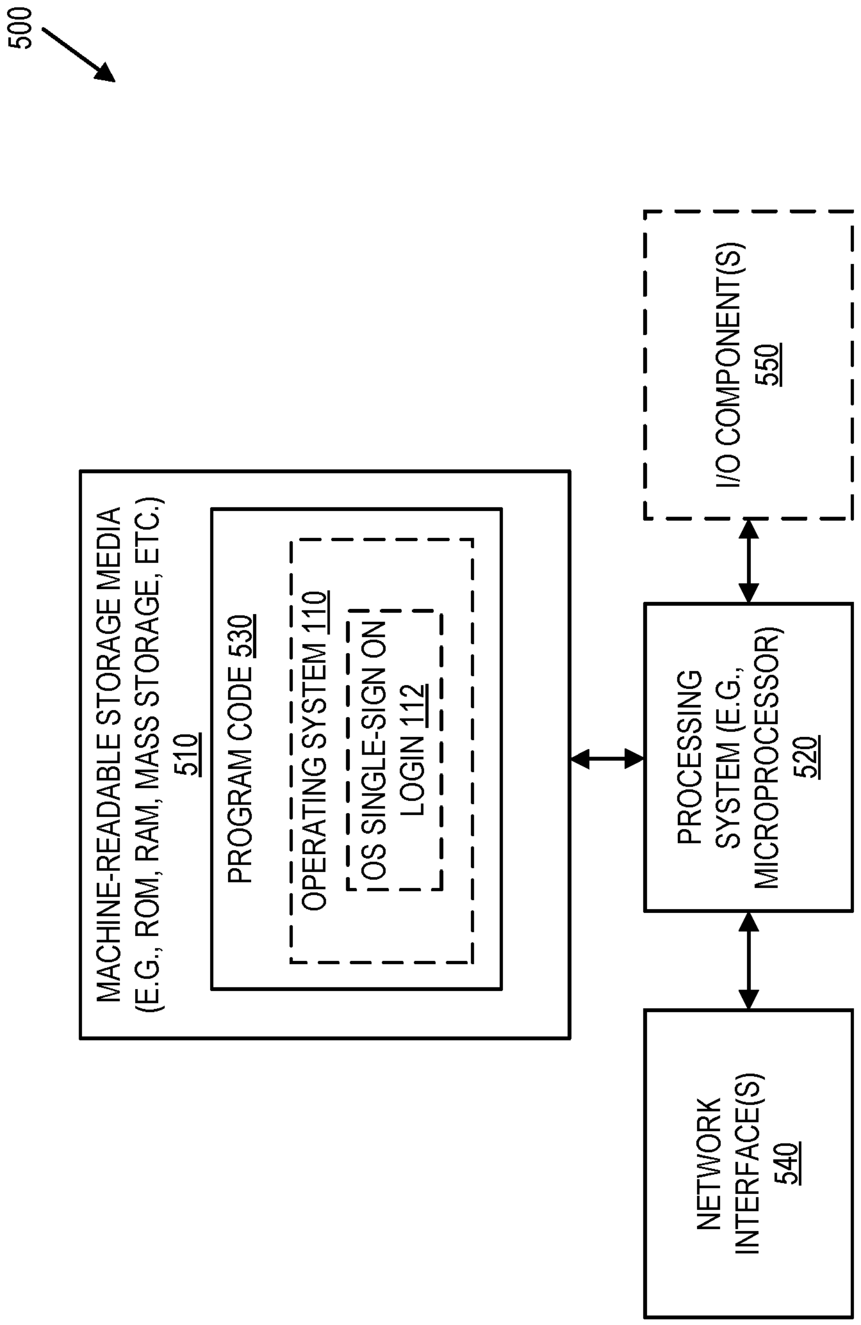
FIG. 5 is a block diagram illustrating a data processing system that can be used in an embodiment.

FIG. 5 illustrates a block diagram for an exemplary data processing system 500 that may be used in some embodiments. One or more such data processing systems 500 may be utilized to implement the embodiments and operations described with respect to the end user device 105. Data processing system 500 includes a processing system 520 (e.g., one or more processors and connected system components such as multiple connected chips).

The data processing system 500 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 510 (e.g., magnetic disks, optical disks, read only memory (ROM), flash memory devices, phase change memory) and machine-readable transmission media (also called a carrier) (e.g., electrical, optical, radio, acoustical or other form of propagated signals-such as carrier waves, infrared signals), which is coupled to the processing system 520. For example, the depicted machine-readable storage media 510 may store program code 530 that, when executed by the processing system 520, causes the data processing system 500 to execute the operating system 110 including the OS SSO login 112, the applications 130, and/or perform the operations described herein.

The data processing system 500 also includes one or more network interfaces 540 (e.g., a wired and/or wireless interfaces) that allows the data processing system 500 to transmit data and receive data from other computing devices, typically across one or more networks (e.g., Local Area Networks (LANs), the Internet, etc.). The data processing system 500 may also include one or more input or output ("I/O") components 550 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 500, and, in certain embodiments, fewer components than that shown in One or more buses may be used to interconnect the various components shown in FIG. 5.

The techniques shown in the figures can be implemented using code and data stored and executed on one or more electronic devices (e.g., an end user device, a configuration server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth to provide a more thorough understanding. However, embodiments may be practiced without such specific details. In other instances, control structures, gate level circuits and full software instruction sequences have not been shown in detail in order not to obscure understanding. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed in an end user device, comprising:

as part of a login procedure of an operating system of the end user device, launching a single sign-on (SSO) login service that is part of the operating system of the end user device;

displaying a login page of an identity provider through the SSO login service, wherein the login page allows a user of the end user device to submit authentication credentials for the identity provider;

interacting with the identity provider to provide the authentication credentials to the identity provider and receive a plurality of secrets from the identity provider including an access token, an identity token, and a session cookie;

logging the user into the operating system of the end user device using the identity token; and making the plurality of secrets available to one or more applications configured for the SSO login service thereby allowing the user to access the one or more applications without separately providing authentication credentials to the one or more applications.

2. The method of claim 1, wherein interacting with the identity provider includes:

transmitting the authentication credentials to the identity provider;

receiving an authorization code from the identity provider;

transmitting a token request to the identity provider, the token request including a client identifier, a client secret, and the authorization code; and receiving a token response from the identity provider that includes the access token and the identity token.

3. The method of claim 1, further comprising:

personalizing the operating system using information from the identity token.

4. The method of claim 1, wherein the interacting with the identity provider is performed by a web based authentication client of the SSO login service, wherein the web based authentication client does not store the plurality of secrets after the login procedure is complete.

5. The method of claim 1, wherein making the plurality of secrets available includes injecting the session cookie into a cookie store for the one or more applications.

6. The method of claim 1, wherein making the plurality of secrets available includes providing an interface that allows the one or more applications to access the plurality of secrets.

7. The method of claim 1, further comprising:

wherein the identity provider is one of a plurality of identity providers that are configured for the SSO login service; and wherein prior to displaying the login page of the identity provider:

displaying a choice of the plurality of identity providers, and receiving a selection of the identity provider from the user.

8. A non-transitory machine-readable storage medium that provides instructions that, when executed by a processor of an end user device, cause the end user device to perform operations comprising:

as part of a login procedure of an operating system of the end user device, launching a single sign-on (SSO) login service that is part of the operating system of the end user device;

displaying a login page of an identity provider through the SSO login service, wherein the login page allows a user of the end user device to submit authentication credentials for the identity provider;

interacting with the identity provider to provide the authentication credentials to the identity provider and receive a plurality of secrets from the identity provider including an access token, an identity token, and a session cookie;

logging the user into the operating system of the end user device using the identity token; and making the plurality of secrets available to one or more applications configured for the SSO login service thereby allowing the user to access the one or more applications without separately providing authentication credentials to the one or more applications.

9. The non-transitory machine-readable storage medium of claim 8, wherein interacting with the identity provider includes:

transmitting the authentication credentials to the identity provider;

receiving an authorization code from the identity provider;

transmitting a token request to the identity provider, the token request including a client identifier, a client secret, and the authorization code; and receiving a token response from the identity provider that includes the access token and the identity token.

10. The non-transitory machine-readable storage medium of claim 8, wherein the operations further comprise:

personalizing the operating system using information from the identity token.

11. The non-transitory machine-readable storage medium of claim 8, wherein the interacting with the identity provider is performed by a web based authentication client of the SSO login service, wherein the web based authentication client does not store the plurality of secrets after the login procedure is complete.

12. The non-transitory machine-readable storage medium of claim 8, wherein making the plurality of secrets available includes injecting the session cookie into a cookie store for the one or more applications.

13. The non-transitory machine-readable storage medium of claim 8, wherein making the plurality of secrets available includes providing an interface that allows the one or more applications to access the plurality of secrets.

14. The non-transitory machine-readable storage medium of claim 8, wherein the operations further comprise:
- wherein the identity provider is one of a plurality of identity providers that are configured for the SSO login service; and
- wherein prior to displaying the login page of the identity provider:
  - displaying a choice of the plurality of identity providers, and
  - receiving a selection of the identity provider from the user.

15. An end user device, comprising:
- a set of one or more processors; and
- a non-transitory machine-readable storage medium that provides instructions that, when executed by the set of one or more processors, cause the end user device to perform operations comprising:
  - as part of a login procedure of an operating system of the end user device, launching a single sign-on (SSO) login service that is part of the operating system of the end user device;
  - displaying a login page of an identity provider through the SSO login service, wherein the login page allows a user of the end user device to submit authentication credentials for the identity provider;
  - interacting with the identity provider to provide the authentication credentials to the identity provider and receive a plurality of secrets from the identity provider including an access token, an identity token, and a session cookie;
  - logging the user into the operating system of the end user device using the identity token; and
  - making the plurality of secrets available to one or more applications configured for the SSO login service thereby allowing the user to access the one or more applications without separately providing authentication credentials to the one or more applications.

16. The end user device of claim 15, wherein interacting with the identity provider includes:
- transmitting the authentication credentials to the identity provider;
- receiving an authorization code from the identity provider;
- transmitting a token request to the identity provider, the token request including a client identifier, a client secret, and the authorization code; and
- receiving a token response from the identity provider that includes the access token and the identity token.

17. The end user device of claim 15, wherein the operations further comprise:
- personalizing the operating system using information from the identity token.

18. The end user device of claim 15, wherein the interacting with the identity provider is performed by a web based authentication client of the SSO login service, wherein the web based authentication client does not store the plurality of secrets after the login procedure is complete.

19. The end user device of claim 15, wherein making the plurality of secrets available includes injecting the session cookie into a cookie store for the one or more applications.

20. The end user device of claim 15, wherein making the plurality of secrets available includes providing an interface that allows the one or more applications to access the plurality of secrets.

21. The end user device of claim 15, wherein the operations further comprise:
- wherein the identity provider is one of a plurality of identity providers that are configured for the SSO login service; and
- wherein prior to displaying the login page of the identity provider:
  - displaying a choice of the plurality of identity providers, and
  - receiving a selection of the identity provider from the user.

* * * * *